US00RE47239E

(19) United States
(12) Reissued Patent
Lee et al.

(10) Patent Number: US RE47,239 E
(45) Date of Reissued Patent: Feb. 12, 2019

(54) METHOD AND APPARATUS FOR PROVIDING TRANSPORTATION STATUS INFORMATION AND USING IT

(71) Applicant: LG ELECTRONICS INC., Seoul (KR)

(72) Inventors: Joon Hwi Lee, Seoul (KR); Young In Kim, Gyeongsangnam-do (KR); Chul Hyun Seo, Seoul (KR)

(73) Assignee: LG Electronics Inc., Seoul (KR)

(21) Appl. No.: 14/567,424

(22) Filed: Dec. 11, 2014

Related U.S. Patent Documents

Reissue of:
(64) Patent No.: 8,332,131
Issued: Dec. 11, 2012
Appl. No.: 11/914,682
PCT Filed: May 17, 2006
PCT No.: PCT/KR2006/001843
§ 371 (c)(1),
(2) Date: May 6, 2008
PCT Pub. No.: WO2006/123896
PCT Pub. Date: Nov. 23, 2006

U.S. Applications:
(60) Provisional application No. 60/681,971, filed on May 18, 2005, provisional application No. 60/759,963, filed on Mar. 24, 2006.

(30) Foreign Application Priority Data

Mar. 24, 2006 (KR) ..... 10-2006-0027063

(51) Int. Cl.
*G08G 1/00* (2006.01)
*G08G 1/09* (2006.01)

(52) U.S. Cl.
CPC ..... *G08G 1/092* (2013.01)

(58) Field of Classification Search
CPC ..... G01G 1/092
(Continued)

(56) References Cited

U.S. PATENT DOCUMENTS 4,907,159 A 3/1990 Mauge
5,649,297 A 7/1997 Park
(Continued)

FOREIGN PATENT DOCUMENTS

DE 19733179 A1 2/1998
DE 197 33 179 5/1998
(Continued)

OTHER PUBLICATIONS

U.S. Office Action dated Dec. 1, 2008 for U.S. Appl. No. 11/424,111, 22 pages.
(Continued)

*Primary Examiner* — Matthew C Graham
(74) *Attorney, Agent, or Firm* — Fish & Richardson P.C.

(57) ABSTRACT

A method and apparatus for providing road status information and using the same are disclosed. A method for encoding traffic information includes the steps of: generating message management information including message identification (ID) information indicating that the traffic information is status information; generating status information including traffic status information; generating location information corresponding to the traffic status information; and generating a traffic information message including the message management information, the status information, and the location information. Therefore, the method provides a vehicle driver who travels along a traffic-jam road or congested road with road traffic status information in real time, such that the vehicle driver can arrive a desired destination within the shortest time using predicted road traffic information.

17 Claims, 14 Drawing Sheets

(58) Field of Classification Search
USPC ..... 701/117–119
See application file for complete search history.

(56) References Cited

U.S. PATENT DOCUMENTS

| | | | | |
|---|---|---|---|---|
| 5,662,109 | A | 9/1997 | Hutson | |
| 5,933,100 | A | 8/1999 | Golding | |
| 6,067,499 | A | 5/2000 | Yagyu et al. | |
| 6,067,502 | A | 5/2000 | Hayashida et al. | |
| 6,075,467 | A | 6/2000 | Ninagawa | |
| 6,085,137 | A | 7/2000 | Aruga et al. | |
| 6,101,443 | A | 8/2000 | Kato et al. | |
| 6,115,667 | A * | 9/2000 | Nakamura | 701/451 |
| 6,125,323 | A | 9/2000 | Nimura et al. | |
| 6,128,571 | A | 10/2000 | Ito et al. | |
| 6,232,917 | B1 | 5/2001 | Baumer | |
| 6,236,933 | B1 | 5/2001 | Lang | |
| 6,297,748 | B1 | 10/2001 | Lappenbusch et al. | |
| 6,324,466 | B1 | 11/2001 | Vieweg | |
| 6,401,027 | B1 | 6/2002 | Xu et al. | |
| 6,434,477 | B1 | 8/2002 | Goss | |
| 6,438,490 | B2 | 8/2002 | Ohta | |
| 6,438,561 | B1 | 8/2002 | Israni | |
| 6,453,230 | B1 | 9/2002 | Geurts | |
| 6,477,459 | B1 | 11/2002 | Wunderlich | |
| 6,594,576 | B2 | 7/2003 | Fan | |
| 6,597,982 | B1 | 7/2003 | Schmidt | |
| 6,610,321 | B2 | 8/2003 | Huang et al. | |
| 6,611,749 | B1 | 8/2003 | Berwanger | |
| 6,615,133 | B2 | 9/2003 | Boies | |
| 6,618,667 | B1 | 9/2003 | Berwanger | |
| 6,633,808 | B1 | 10/2003 | Schulz et al. | |
| 6,687,611 | B1 | 2/2004 | Hessing et al. | |
| 6,741,932 | B1 | 5/2004 | Groth | |
| 6,810,321 | B1 | 10/2004 | Cook | |
| 6,873,904 | B2 | 3/2005 | Yamamoto et al. | |
| 6,904,362 | B2 * | 6/2005 | Nakashima et al. | 701/421 |
| 6,924,751 | B2 | 8/2005 | Hempel et al. | |
| 6,970,132 | B2 | 11/2005 | Spilker, Jr. | |
| 6,990,407 | B1 | 1/2006 | Mbekeani et al. | |
| 6,995,769 | B2 | 2/2006 | Ordentlich | |
| 6,996,089 | B1 | 2/2006 | Ruf | |
| 7,013,983 | B2 * | 3/2006 | Matsumoto et al. | 172/824 |
| 7,047,247 | B1 | 5/2006 | Petzold et al. | |
| 7,106,219 | B2 | 9/2006 | Pearce | |
| 7,139,467 | B2 | 11/2006 | Seo et al. | |
| 7,139,659 | B2 | 11/2006 | Mbekeani et al. | |
| 7,188,025 | B2 | 3/2007 | Hudson | |
| 7,251,558 | B1 | 7/2007 | McGrath | |
| 7,269,503 | B2 * | 9/2007 | McGrath | 701/117 |
| 7,319,931 | B2 | 1/2008 | Uyeki et al. | |
| 7,355,528 | B2 | 4/2008 | Yamane | |
| 7,373,247 | B2 * | 5/2008 | Park | 701/451 |
| 7,375,649 | B2 | 5/2008 | Gueziec | |
| 7,403,852 | B2 | 7/2008 | Mikuriya et al. | |
| 7,609,176 | B2 | 10/2009 | Yamane et al. | |
| 7,650,227 | B2 | 1/2010 | Kirk et al. | |
| 7,657,372 | B2 | 2/2010 | Adachi et al. | |
| 7,668,209 | B2 | 2/2010 | Kim et al. | |
| 7,701,850 | B2 | 4/2010 | Kim et al. | |
| 7,729,335 | B2 | 6/2010 | Lee et al. | |
| 7,739,037 | B2 | 6/2010 | Sumizawa et al. | |
| 7,825,825 | B2 | 11/2010 | Park | |
| 7,877,203 | B2 | 1/2011 | Mikuriya et al. | |
| 7,907,590 | B2 | 3/2011 | Lee et al. | |
| 7,940,741 | B2 | 5/2011 | Lee et al. | |
| 7,940,742 | B2 | 5/2011 | Lee et al. | |
| 2001/0001848 | A1 | 5/2001 | Oshizawa et al. | |
| 2001/0028314 | A1 | 10/2001 | Hessing et al. | |
| 2003/0036824 | A1 | 2/2003 | Kuroda et al. | |
| 2003/0083813 | A1 | 5/2003 | Park | |
| 2003/0102986 | A1 | 6/2003 | Hempel et al. | |
| 2003/0179110 | A1 | 9/2003 | Kato | |
| 2004/0076275 | A1 | 4/2004 | Katz | |
| 2004/0148092 | A1 | 7/2004 | Kim et al. | |
| 2004/0198339 | A1 | 10/2004 | Martin | |
| 2004/0246888 | A1 | 12/2004 | Peron | |
| 2004/0249560 | A1 | 12/2004 | Kim et al. | |
| 2005/0027437 | A1 | 2/2005 | Takenaga et al. | |
| 2005/0038596 | A1 | 2/2005 | Yang et al. | |
| 2005/0081240 | A1 | 4/2005 | Kim | |
| 2005/0107944 | A1 | 5/2005 | Hovestadt et al. | |
| 2005/0141428 | A1 | 6/2005 | Ishikawa | |
| 2005/0143906 | A1 | 6/2005 | Ishikawa et al. | |
| 2005/0198133 | A1 | 9/2005 | Karaki | |
| 2005/0206534 | A1 | 9/2005 | Yamane | |
| 2005/0209772 | A1 | 9/2005 | Yoshikawa | |
| 2005/0231393 | A1 | 10/2005 | Berger | |
| 2006/0139234 | A1 * | 6/2006 | Tanaka | 345/9 |
| 2006/0143009 | A1 | 6/2006 | Jost et al. | |
| 2006/0173841 | A1 | 8/2006 | Bill | |
| 2006/0178105 | A1 * | 8/2006 | Kim | 455/3.01 |
| 2006/0178807 | A1 * | 8/2006 | Kato et al. | 701/117 |
| 2006/0262662 | A1 | 11/2006 | Jung et al. | |
| 2006/0265118 | A1 | 11/2006 | Lee | |
| 2006/0268721 | A1 | 11/2006 | Lee | |
| 2006/0268736 | A1 | 11/2006 | Lee | |
| 2006/0268737 | A1 | 11/2006 | Lee et al. | |
| 2006/0271273 | A1 | 11/2006 | Lee et al. | |
| 2006/0281444 | A1 | 12/2006 | Jung | |
| 2007/0005795 | A1 | 1/2007 | Gonzalez | |
| 2007/0019562 | A1 | 1/2007 | Kim | |
| 2007/0122116 | A1 | 5/2007 | Seo et al. | |
| 2007/0167172 | A1 | 7/2007 | Kim et al. | |
| 2008/0249700 | A1 | 10/2008 | Kim et al. | |

FOREIGN PATENT DOCUMENTS

| | | | |
|---|---|---|---|
| DE | 10101349 | A1 | 1/2001 |
| DE | 100 60 599 | | 6/2004 |
| DE | 10060599 | A1 | 6/2004 |
| EP | 0 725 500 | | 8/1996 |
| EP | 0 725 500 | A | 8/1996 |
| EP | 1 049 277 | A | 2/2000 |
| EP | 1 006 684 | | 6/2000 |
| EP | 1 006 684 | A | 6/2000 |
| EP | 1 030 475 | | 8/2000 |
| EP | 1 030 475 | A | 8/2000 |
| EP | 1 041 755 | | 10/2000 |
| EP | 1 041 755 | A | 10/2000 |
| EP | 1 049 277 | | 11/2000 |
| EP | 1 079 353 | | 2/2001 |
| EP | 1 079 353 | A | 2/2001 |
| EP | 0 725 500 | B1 | 4/2003 |
| EP | 725500 | B1 | 4/2003 |
| EP | 1 376 512 | | 1/2004 |
| EP | 1 376 512 | A1 | 1/2004 |
| EP | 1 445 750 | | 8/2004 |
| EP | 1 445 750 | A | 8/2004 |
| EP | 1 460 599 | | 9/2004 |
| EP | 1 460 599 | A | 9/2004 |
| EP | 1 150 265 | B1 | 10/2006 |
| GB | 2 342 260 | | 4/2000 |
| GB | 2342260 | A | 4/2000 |
| JP | 09-062884 | | 3/1997 |
| JP | 09-062884 | A | 3/1997 |
| JP | 11-160081 | | 6/1999 |
| JP | 11-160081 | A | 6/1999 |
| JP | 2001-082967 | | 3/2001 |
| JP | 2001-082967 | A | 3/2001 |
| JP | 2001-227963 | A | 8/2001 |
| JP | 2001-272246 | | 10/2001 |
| JP | 2001-272246 | A | 10/2001 |
| JP | 2004-164373 | | 6/2004 |
| JP | 2004-164373 | A | 6/2004 |
| JP | 2004-186741 | | 7/2004 |
| JP | 2004-186741 | A | 7/2004 |
| JP | 2004-295736 | | 10/2004 |
| JP | 2004-295736 | A | 10/2004 |
| JP | 2004-355662 | | 12/2004 |
| JP | 2004-355662 | A | 12/2004 |
| JP | 2005-056061 | | 3/2005 |
| JP | 2005-056061 | A | 3/2005 |
| KR | 10-1999-0025959 | | 4/1999 |

(56) References Cited

FOREIGN PATENT DOCUMENTS

| | | | |
|---|---|---|---|
| KR | 10-1999-0025959 | A | 4/1999 |
| KR | 10-2001-0016252 | | 3/2001 |
| KR | 10-2001-0016252 | A | 3/2001 |
| KR | 10-2002-0017535 | | 3/2002 |
| KR | 10-2002-0017535 | A | 3/2002 |
| KR | 10-2003-0034915 | | 5/2003 |
| KR | 10-2003-0034915 | A | 5/2003 |
| KR | 10-2003-0037455 | | 5/2003 |
| KR | 10-2003-0037455 | A | 5/2003 |
| KR | 10-2004-0033141 | | 4/2004 |
| KR | 10-2004-0033141 | A | 4/2004 |
| KR | 10-2004-0084374 | | 10/2004 |
| KR | 10-2004-0084374 | A | 10/2004 |
| KR | 10-2004-0084508 | | 10/2004 |
| KR | 10-2004-0084508 | A | 10/2004 |
| KR | 10-2005-0037776 | | 4/2005 |
| KR | 10-2005-0037776 | A | 4/2005 |
| KR | 10-2005-0062320 | | 6/2005 |
| KR | 10-2005-0062320 | A | 6/2005 |
| KR | 10-2006-0002468 | | 1/2006 |
| KR | 10-2006-0002468 | A | 1/2006 |
| KR | 10-0565089 | B1 | 3/2006 |
| KR | 10-2006-0063563 | | 6/2006 |
| KR | 10-2006-0063563 | A | 6/2006 |
| KR | 10-2006-0063629 | | 6/2006 |
| KR | 10-2006-0063629 | A | 6/2006 |
| KR | 10-2006-0076574 | | 7/2006 |
| KR | 10-2006-0076574 | A | 7/2006 |
| KR | 10-2006-0129769 | A | 12/2006 |
| WO | WO 98/24079 | | 6/1998 |
| WO | WO 98/26395 | | 6/1998 |
| WO | WO 98/26396 | | 6/1998 |
| WO | WO 1998/024079 | A1 | 6/1998 |
| WO | WO 1998/026395 | A1 | 6/1998 |
| WO | WO 1998/026396 | A1 | 6/1998 |
| WO | WO 98/41959 | | 9/1998 |
| WO | WO 1998/041959 | A1 | 9/1998 |
| WO | WO9841959 | A1 | 9/1998 |
| WO | WO 00/30058 | | 5/2000 |
| WO | WO 2000/030058 | A1 | 5/2000 |
| WO | WO 00/36771 | | 6/2000 |
| WO | WO 2000/036771 | A1 | 6/2000 |
| WO | WO 00/39774 | | 7/2000 |
| WO | WO 2000/039774 | A1 | 7/2000 |
| WO | WO 01/06478 | | 1/2001 |
| WO | WO 2001/006478 | A1 | 1/2001 |
| WO | WO 01/18767 | | 3/2001 |
| WO | WO 01/18768 | | 3/2001 |
| WO | WO 2001/018767 | A1 | 3/2001 |
| WO | WO 2001/018768 | A1 | 3/2001 |
| WO | WO0118767 | A1 | 3/2001 |
| WO | WO0118768 | A1 | 3/2001 |
| WO | WO 01/31497 | | 5/2001 |
| WO | WO 2001/031497 | A1 | 5/2001 |
| WO | WO 02/01532 | | 1/2002 |
| WO | WO 2002/001532 | A1 | 1/2002 |
| WO | WO 02/13161 | | 2/2002 |
| WO | WO 2002/013161 | A1 | 2/2002 |
| WO | WO 02/082402 | | 10/2002 |
| WO | WO 2002/082402 | A1 | 10/2002 |
| WO | WO 2004/036545 | A1 | 4/2004 |
| WO | WO 2005/020576 | | 3/2005 |
| WO | WO 2005/020576 | A1 | 3/2005 |

OTHER PUBLICATIONS

U.S. Office Action dated Jan. 2, 2009 for U.S. Appl. No. 11/419,095, 32 pages.
U.S. Office action dated Feb. 24, 2009 for U.S. Appl. No. 11/419,127, 32 pages.
"Traffic and Travel Information (TTI)—TTI via Transport Protocol Experts Group (TPEG) Extensible Markup Language (XML.sub.----Part 1: Introduction, common data types and tpegML," Technical Specification, ISO/TS 24530-1, First Edition, Apr. 15, 2006, 20 pages.
Bev Marks, "TPEG—Standardized at Last," Oct. 2005. European Office Action and Search Report issued in Application No. 09159699.9-2215 dated Jun. 26, 2009.
U.S. Notice of Allowance issued in U.S. Appl. No. 11/419,095 dated Dec. 3, 2009.
U.S. Office Action issued in U.S. Appl. No. 11/419,127 dated Dec. 14, 2009.
U.S. Office Action issued in U.S. Appl. No. 11/419,187 dated Feb. 19, 2010, 30 pages.
U.S. Office Action issued in U.S. Appl. No. 11/424,111 dated Feb. 3, 2010, 21 pages.
U.S. Office Action issued in U.S. Appl. No. 11/419,164 dated Mar. 11, 2010, 32 pages.
U.S. Office Action dated Apr. 3, 2009 for U.S. Appl. No. 11/419,164, 36 pages.
U.S. Office Action issued in U.S. Appl. No. 11/419,164 dated Oct. 1, 2009, 30 pages.
U.S. Office Action issued in U.S. Appl. No. 11/419,178 dated Sep. 3, 2009, 10 pages.
U.S. Notice of Allowance dated Aug. 9, 2010 for U.S. Appl. No. 11/419,095, 17 pages.
U.S. Office Action issued in U.S. Appl. No. 11/420,679 dated Nov. 12, 2010, 10 pages.
U.S. Notice of Allowance issued in U.S. Appl. No. 11/419,095 dated Aug. 9, 2010, 17 pages.
U.S. Notice of Allowance issued in U.S. Appl. No. 11/419,127 dated Aug. 23, 2010, 17 pages.
U.S. Notice of Allowance issued in U.S. Appl. No. 11/419,164 dated Sep. 8, 2010, 11 pages.
U.S. Office Action issued in U.S. Appl. No. 11/419,187 dated Aug. 13, 2010, 16 pages.
U.S. Office Action issued in U.S. Appl. No. 11/624,424 dated Oct. 6, 2010, 28 pages.
European Search Report dated Jul. 30, 2008 for Application No. 06747437.9, 9 pages.
European Search Report dated Nov. 17, 2008 for Application No. 06747441.1, 7 pages.
International Search Report dated Sep. 6, 2006, Application No. PCT/KR2006/001843, 5 pages.
International Search Report dated Apr. 25, 2007, Application No. PCT/KR2007/000324, 3 pages.
International Search Report dated May 8, 2007, Application No. PCT/KR2007/000318, 3 pages.
Office Action dated Dec. 1, 2008 for U.S. Appl. No. 11/424,111, 22 pages.
European Search Report dated Jun. 30, 2008 for Application No. 06747440.3, 10 pages.
European Search Report dated Aug. 11, 2008 for Application No 06747441.1, 8 pages.
European Search Report dated Aug. 14, 2008 for Application No. 06747433.8, 11 pages.
European Search Report dated Sep. 25, 2008 for Application No. 06747435.3, 8 pages.
European Search Report dated Sep. 30, 2008 for Application No. 06747474.2, 8 pages.
European Search Report dated Oct. 15, 2008 for Application No. 06747434.6, 8 pages.
International Search Report dated Aug. 28, 2006 for Application No. PCT/KR2006/001859, 1 page.
International Search Report dated Aug. 28, 2006 for Application No. PCT/KR2006/001860, 1 page.
International Search Report dated Sep. 6, 2006 for Application No. PCT/KR2006/001834, 1 page.
International Search Report dated Sep. 27, 2006 for Application No. PCT/KR2006/001837, 2 pages.
International Search Report dated Oct. 19, 2006 for Application No. PCT/KR2006/001835, 2 pages.
International Search Report dated Oct. 19, 2006 for Application No. PCT/KR2006/002068, 1 page.
Tristan Ferne, BBC Research & Development, TPEG C++ Libraray Documentation (v2.0), dated Mar. 20, 2002, 10 pages.
U.S. Office Action for U.S. Appl. No. 11/424,111, dated Aug. 11, 2009, 14 pages.

(56) References Cited

OTHER PUBLICATIONS

U.S. Office Action dated Jul. 22, 2009 for U.S. Appl. No. 11/419,127, 18 pages.
"TPEG TEC Application Specification," Working Document, Development Project, Mobile.Info, Mar. 9, 2006, 30 pages.
European Search Report dated Jun. 20, 2008 for Application No. 06747461.9, 8 pages.
European Search Report dated Nov. 4, 2009 issued in European Application No. 09171279.4-2215, 7 pages.
European Search Report dated Oct. 23, 2009 for Application No. 09170601.0-2215.
European Search Report dated Oct. 26, 2009 for Application No. 09170878.4-2215.
International Search Report dated Sep. 6, 2006 for Application No. PCT/KR2006/2002012, 2 pages.
U.S. Office Action dated Sep. 3, 2009 for U.S. Appl. No. 11/419,178, 10 pages.
U.S. Office Action for U.S. Appl. No. 11/419,095 dated Jul. 31, 2009, 30 pages.
European Search Report dated Jul. 30, 2008, Application No. 06747437.9-2215, 9 pages.
European Search Report dated Sep. 4, 2009 for Application No. 09165793.2-2215, 9 pages.
Korean Office Action dated Nov. 11, 2006 for Application No. KR 10-2005-0086890.
U.S. Office Action dated Jun. 7, 2010 for U.S. Appl. No. 11/419,127, 24 pages.
U.S. Office Action dated Jul. 8, 2010 for U.S. Appl. No. 11/420,679, 8 pages.
U.S. Notice of Allowance dated Jul. 21, 2010 for U.S. Appl. No. 11/419,164, 15 pages.
Korean Notice of Allowance dated Jan. 27, 2012 for Application No. 10-2005-0097452, with English translation, 3 pages.
U.S. Non-Final Office Action dated Feb. 3, 2011 for U.S. Appl. No. 11/419,178, 12 pages.
U.S. Notice of Allowance dated Apr. 8, 2011 for U.S. Appl. No. 11/624,424, 9 pages.
U.S. Office Action dated May 6, 2011 for U.S. Appl. No. 11/424,111, 20 pages.
U.S. Notice of Allowance and Fee(s) Due for US. Appl. No. 11/419,127 dated Dec. 13, 2010, 17 pages.
U.S. Notice of Allowance, dated Aug. 1, 2011 for the U.S. Appl. No. 11/419,178, 11 pages.

* cited by examiner

FIG. 3A

```
<ctt_components>:=
<intunti>(n),                    : number of components ~ 302
.n*<ctt_component()>;            : traffic information message component
                                                          304
```

FIG. 3B

```
<ctt_component(x)>:=             : Traffic information message component template
<intunti>(id),                   : Identifier(id) ~ 312
                                                          314
<intunti>(n),                    : Length, n, of component data in bytes(n)
n*<byte>;                        : component data ~ 316
```

FIG. 3C

```
<ctt_components(x)>:=            : CTT-Loc
<intunti>(id),                   : Identifier(id)
```

FIG. 4

| | Class | Description |
|---|---|---|
| 402 | CTT_Status | Describe vehicle's traffic-carrying status at traffic network or predetermined road link |
| 404 | Prediction_CTT_Status | Describe vehicle's traffic-carrying prediction status at traffic network or predetermined road link |
| 406 | Additional Information | Describe traffic-carrying status additional information in the form of text data |

FIG. 5A

| | |
|---|---|
| <ctt_component(80)>:= | : CTT status |
| <intunti>(id), | : Identifier,id=80 hex ~ 502 |
| <intunti>(n), | : Length, n, of component data in bytes (n) ~ 504 |
| m*<status_component>; | : Status component ~ 506 |

FIG. 5B

| | |
|---|---|
| <status_component(00)>:= | : Average link speed |
| <intunti>(id), | : Identifier,id=00 hex |
| <intunti>(n), | : Length, n, of component data in bytes(n) |
| <intunli>; | : speed(Km/h) |

FIG. 5C

| | |
|---|---|
| <status_component(01)>:= | : Travel time |
| <intunti>(id), | : Identifier,id=01 hex |
| <intunti>(n), | : Length, n, of component data in bytes (n) |
| <intunli>; | : time (sec.) |

FIG. 5D

| | |
|---|---|
| <status_component(02)>:= | : Link delay time |
| <intunti>(id), | : Identifier,id=02 hex |
| <intunti>(n), | : Length, n, of component data in bytes (n) |
| <intunli>; | : time (sec.) |

FIG. 5E

| | |
|---|---|
| <status_component(03)>:= | : Congestion type |
| <intunti>(id), | : Identifier,id=03 hex |
| <intunti>(n), | : Length, n, of component data in bytes (n) |
| <ctt03>; | : Congestion type |

FIG. 6A

| | |
|---|---|
| <ctt_component(81)>:= | : Prediction CTT status |
| <intunti>(id), | : Identifier,id=81 hex ~ 602 |
| <intunti>(n), | : Length, n, of component data in bytes (n) 604 |
| m*<prediction_status_component()>; | : Prediction status component ~ 606 |

FIG. 6B

| | |
|---|---|
| <prediction_status_component(00)>:= | : Prediction average link speed |
| <intunti>(id), | : Identifier,id=00 hex |
| <intunti>(n), | : Length, n, of component data in bytes (n) |
| <intunti>; | : Speed(Km/h) |
| <intunlo>; | : Prediction time (UTC) |

FIG. 6C

| | |
|---|---|
| <prediction_status_component(01)>:= | : Prediction travel time |
| <intunti>(id), | : Identifier,id=01 hex |
| <intunti>(n), | : Length, n, of component data in bytes(n) |
| <intunli>; | : Time (sec.) |
| <intunlo>; | : Prediction time (UTC) |

FIG. 6D

| | |
|---|---|
| <prediction_status_component(02)>:= | : Congestion tendency |
| <intunti>(id), | : Identifier,id=02 hex |
| <intunti>(n), | : Length, n, of component data in bytes (n) |
| <ctt04>; | : Congestion tendency |

FIG. 7

| | |
|---|---|
| <ctt_component(8A)>:= | : Additional information |
| <intunti>(id), | : Identifier,id=8A hex |
| <intunli>(n), | : Length, n, of component data in bytes (n) |
| <ctt41>; | : Language code |
| <short_string>; | : Additional information |

FIG. 8

```
<ctt_component(90)>:=                    : TPEG Location Referencing ToolBox
  <intunti>(id),                         : Identifier, id=90 hex      ~ 802
  <intunli>(n),                          : Length, n, of component data in bytes (n)  ~ 804
  m*<tpeg_loc_container()>;              : TPEG Location Container component
                                                                                  806
```

FIG. 9

```
<tpeg_loc_container>:=                   :
  <loc41>,                               : Default language for TPEG-Loc Component
  m*<tpeg-loc-component()>;              : TPEG-Loc component
```

FIG. 10A

| | | |
|---|---|---|
| <tpeg_loc_component(00)>:= | : Location co-ordinates component | |
| <intunti>(id), | : Identifier, id=00 hex | 1002 |
| <intunli>(n), | : Length, n, of component data in bytes (n) | 1004 |
| <loc01>, | : Location type, TPEG table loc01 | 1006 |
| m*<co-ordinates component()>; | : Location co-ordinates component | 1008 |

FIG. 10B

| | |
|---|---|
| <co-ordinates_component(00)>:= | : Road type list |
| <intunti>(id), | : Identifier, id=00 hex |
| <intunti>(n), | : Length, n, of component data in bytes(n) |
| m*<roadtype_component()>; | : Road type component |

FIG. 10C

| | |
|---|---|
| <roadtype_component(00)>:= | : Road type component |
| <intunti>(id), | : Identifier, id=00 hex |
| <intunti>(n), | : Length, n, of component data in bytes(n) |
| <loc42>; | : Road type, TPEG table loc42 |

FIG. 10D

| | |
|---|---|
| <co-ordinates_component(01)>:= | : WGS84 |
| <intunti>(id), | : Identifier, id=01 hex |
| <intunti>(n), | : Length, n, of component data in bytes(n) |
| <intunloi>(longitude), | : Longitude(in 10 micro-degrees units) |
| <intunlo>(latitude), | : Latitude(in 10 micro-degrees units) |
| m*<WGS84_component>; | : WGS 84 component |

FIG. 10E

| | |
|---|---|
| <WGS84_component(00)>:= | : Expansion |
| <intunti>(id), | : Identifier, id=00 hex |
| <intunti>(n), | : Length, n, of component data in bytes(n) |
| <intunli>; | : Radius of circle (in meters * 10) |

FIG. 10F

| | |
|---|---|
| <co-ordinates_component(02)>:= | : Vertex information |
| <intunti>(id), | : Identifier, id=02 hex |
| <intunti>(n), | : Length, n, of component data in bytes(n) |
| <intunti>, | : The number of vertexes |
| m*<Vertex_component> | : Vertex component |

FIG. 10G

| | |
|---|---|
| <vertex_component(00)>:= | : Vertexes(wgs84) |
| <intunti>(id), | : Identifier, id=00 hex |
| <intunti>(n), | : Length, n, of component data in bytes(n) |
| <intunti>, | : the order of vertexes from 0 |
| <intunlo>(longitude), | : Longitude(in 10 micro-degrees units) |
| <intunlo>(latitude); | : Latitude(in 10 micro-degrees units) |

FIG. 10H

| | |
|---|---|
| <co-ordinates_component(10)>:= | : Link ID |
| <intunti>(id), | : Identifier, id=10 hex |
| <intunti>(n), | : Length, n, of component data in bytes(n) |
| <loc43>, | : ID type |
| m*<link_component>; | : link component |

FIG. 10I

| | |
|---|---|
| <Link_component(00)>:= | : Expansion |
| <intunti>(id), | : Identifier, id=00 hex |
| <intunti>(n), | : Length, n, of component data in bytes(n) |
| <intunlo>; | : Link ID |

FIG. 10J

| | |
|---|---|
| <co-ordinates_component(03)>:= | : Descriptor |
| <intunti>(id), | : Identifier, id=03 hex |
| <intunti>(n), | : Length, n, of component data in bytes(n) |
| <loc03>, | : Descriptor type |
| <short_string>(name) | : Descriptor |
| m*<descriptor_component>; | : Descriptor components |

FIG. 10K

| | |
|---|---|
| <descriptor_component(00)>:= | : Direction type |
| <intunti>(id), | : Identifier, id=00 hex |
| <intunti>(n), | : Length, n, of component data in bytes(n) |
| <loc02>; | : Direction type, TPEG table loc02 |

FIG. 11A

| TPEG table CTT 03: traffic delay degree | | | |
|---|---|---|---|
| Code | Type | Content | example |
| 0 | unknown | | |
| 1 | noncongested | | |
| 2 | crowded | | |
| 3 | congested | | |
| 4 | traffic jam | | |
| ... | | | |
| ... | | | |
| 255 | | | |

FIG. 11B

| TPEG table CTT 04: link speed variation | | | |
|---|---|---|---|
| Code | Type | Content | example |
| 0 | unknown | | |
| 1 | drawing | | |
| 2 | eliminating | | |
| 3 | constant | | |
| ... | | | |
| ... | | | |
| 255 | | | |

METHOD AND APPARATUS FOR PROVIDING TRANSPORTATION STATUS INFORMATION AND USING IT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,332,131. The reissue applications are application Ser. No. 14/567,424 (the present application), and Ser. No. 14/567,841, all of which are applications for reissue of U.S. Pat. No. 8,332,131.*

*CROSS-REFERENCE TO RELATED APPLICATIONS*

*This application is a reissue application of U.S. application Ser. No. 11/914,682, filed May 6, 2008, now U.S. Pat. No. 8,332,131, issued Dec. 11, 2012, which is a § 371 national stage entry of PCT Application No. PCT/KR2006/001843, filed May 17, 2006, and which claims the benefit of U.S. Provisional Application No. 60/681,971 filed on May 18, 2005, U.S. Provisional Application No. 60/759,963, filed on Mar. 24, 2006 and a foreign priority application filed in Korea as Serial No. 10-2006-0027063 on Mar. 24, 2006. This application claims priority to each of these prior applications.*

TECHNICAL FIELD

The present invention relates to a method and apparatus for providing traffic information of roads, and using the same, and more particularly to a method and apparatus for providing road status information, and using the same.

BACKGROUND ART

With the advancement in digital signal processing technologies and communication technologies, radio- or TV-broadcast technology has been rapidly developed from analog broadcast technology to digital broadcast technology.

Specifically, with the widespread use of vehicles throughout the world, the increasing number of vehicles in urban or downtown areas and people working for 5 day weeks, the number of vehicles in rural districts is also rapidly increased every weekend, such that the necessity of informing drivers of the vehicles of traffic information is also increased.

Due to the increasing necessity of the traffic information, a radio broadcast program of a radio broadcast station recently provides users or drivers with traffic information. However, it has a disadvantage that the users cannot get the traffic information via traffic broadcast at any time because it can provide the users or drivers with the traffic information only at a specific time. It is no possible to provide the users with correct traffic information corresponding to real time because traffic states or information are being changed in real time. In order to solve the above-mentioned problems, a variety of providers currently provide their subscribers with traffic information.

Traffic information requires a standard format because traffic information receiving terminals made by different manufacturers should be able to catch and interpret broadcast traffic information in the same way.

DISCLOSURE OF INVENTION

Accordingly, the present invention is directed to a method and apparatus for providing traffic information, and using the traffic information that substantially obviate one or more problems due to limitations and disadvantages of the related art.

An object of the present invention devised to solve the problem lies on a method for providing traffic information based on the unified standard.

Another object of the present invention devised to solve the problem lies on an apparatus for employing traffic information.

The object of the present invention can be achieved by providing a method for encoding traffic information comprising the steps of: generating message management information including message identification (ID) information indicating that the traffic information is status information; generating status information including traffic status information; generating location information corresponding to the traffic status information; and generating a traffic information message including the message management information, the status information, and the location information.

In another aspect of the present invention, provided herein is a method for decoding a message of traffic information comprising the steps of: extracting message management information including message identification (ID) information indicating that the traffic information is status information; extracting status information including traffic status information and location information corresponding to the traffic status information; and decoding the status information and the location information, and outputting the traffic status information.

In yet another aspect of the present invention, provided herein is an apparatus for decoding a message of traffic information comprising: a decoder for extracting message management information including message identification (ID) information indicating that the traffic information is status information, extracting status information including traffic status information and location information corresponding to the traffic status information, and decoding the status information and the location information; a display; and a controller for displaying the traffic status information on the display by referring to the location information.

Preferably, the traffic status information includes at least one of traffic-flow status information, traffic-flow status prediction information, and additional information.

Preferably, the status information includes a specific identifier (ID) indicating whether the traffic information is the traffic-flow status information, the traffic-flow status prediction information, or the additional information.

In yet another aspect of the present invention, provided herein is a method for encoding traffic information comprising the steps of: generating message management information including message identification (ID) information indicating that the traffic information is status information; generating status information including traffic-flow status information of a link; generating location information including information of the link corresponding to the traffic-flow status information; and d) generating a traffic information message including the message management information, the status information, and the location information.

In yet another aspect of the present invention, provided herein is a method for decoding a message of traffic information message comprising the steps of: extracting message management information including message identification (ID) information indicating that the traffic information is status information; extracting not only status information including traffic-flow status information of a link but also location information including information of the link corresponding to the traffic-flow status information; and decoding the status information and the location information, and outputting the traffic-flow status information.

In yet another aspect of the present invention, provided herein is an apparatus for decoding a message of traffic information message comprising: a decoder for extracting message management information including message identification (ID) information indicating that the traffic information is status information, extracting not only status information including traffic-flow status information of a link but also location information including information of the link corresponding to the traffic-flow status information, and decoding the status information and the location information; a display; and a controller for displaying the traffic-flow status information on the display by referring to the location information.

ADVANTAGEOUS EFFECTS

The method and apparatus for providing/employing traffic information according to the present invention provides a vehicle driver who travels along a traffic jam road or congested road with road traffic status information in real time, such that the vehicle driver can arrive a desired destination within the shortest time using predicted road traffic information.

Also, the method and apparatus for providing traffic information according to the present invention pre-informs users or drivers of the congested traffic status, and properly dissipates the volume of traffic, resulting in the effective implementation of road status information.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 3A is a syntax of some parts of a component frame including traffic information according to the present invention;

FIG. 3B is a structural diagram illustrating a common structure of a traffic information message component according to the present invention;

FIG. 3C is a structural diagram illustrating a structure of a traffic information message component according to the present invention;

FIG. 4 is a structural diagram illustrating a class contained in a status container according to the present invention;

FIG. 5A is a structural diagram illustrating a traffic congestion status component equipped with traffic information contained in a CTT-status container according to the present invention;

FIGS. 5B to 5E show exemplary syntaxes of several status components contained in the traffic congestion status component of FIG. 5A according to the present invention;

FIG. 6A is a structural diagram illustrating a traffic congestion status component equipped with traffic prediction information contained in a CTT-status container according to the present invention;

FIGS. 6B to 6D show exemplary syntaxes of several prediction status components contained in the traffic congestion status component of FIG. 6A according to the present invention;

FIG. 7 is a syntax of a status component including additional information according to the present invention;

FIG. 8 is a structural diagram illustrating a traffic congestion status component equipped with location reference information of a specific section corresponding to status information according to the present invention;

FIG. 9 is a structural diagram illustrating a TPEG location container including location information corresponding to status information according to the present invention;

FIG. 10A is a structural diagram illustrating a TPEG location component equipped with location information contained in a TPEG location container according to the present invention;

FIGS. 10B to 10K exemplarily show a plurality of location coordinates components contained in a status component of FIG. 10A according to the present invention;

FIG. 11A is a code table illustrating the degree of traffic delay from among traffic information according to the present invention;

FIG. 11B is a code table illustrating a link-speed variation from among traffic information according to the present invention;

BEST MODE FOR FLOW OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

A traffic information providing service according to the present invention can be applied to a variety of digital broadcast standards.

Representative examples of the digital broadcast standards are a European DAB (Digital Audio Broadcasting) service based on the Eureka-147 [ETSI EN 300 401], a DVB-T (Digital Video Broadcasting-Terrestrial) service of Europe, a DVB-H (Digital Video Broadcasting-Handheld) service of Europe, a Media FLO (Forward Link Only) service of the United States, and a DMB (Digital Multimedia Broadcasting) service of the Republic of Korea.

The DMB service of the Republic of Korea is classified into a T-DMB (Terrestrial Digital Multimedia Broadcasting) service based on the Eureka-147 and a S-DMB (Satellite Digital Multimedia Broadcasting) service using satellite communication.

Also, the traffic information providing service according to the present invention can be applied to the Internet, e.g., a Wi-Fi or Wibro (Wireless Broadband Internet), etc.

The term "traffic status" is indicative of a road congestion and travel time status, however, it is not limited to the above-mentioned road congestion status and can be applied to similar examples as necessary. For the convenience of description and better understanding of the present invention, the term "traffic status" is referred to as a CTT (Congestion and Travel Time Information) status or a traffic congestion status.

The term "traffic information" is indicative of a traffic accident, an unexpected accident, a public transportation status, and/or a road congestion status, etc., however, it is not limited to the above-mentioned meanings and can be applied to other similar meanings as necessary. For the convenience of description, a specific term "TPEG" (Transport Protocol Expert Group) is exemplarily used as the above-mentioned traffic information.

The term "traffic flow status" is indicative of a traffic-flow status of roads, for example congestion of roads and travel time of transport means (e.g. car) on roads, however, it is not limited to the above-mentioned meaning and can be applied to other similar meaning as necessary.

The term "section" or "link" is indicative of a specific area of roads or a road segment which starts and ends at junctions and has no junction in between. However, it is not limited to the above-mentioned meaning and can be applied to other similar meaning as necessary.

Figure 1:
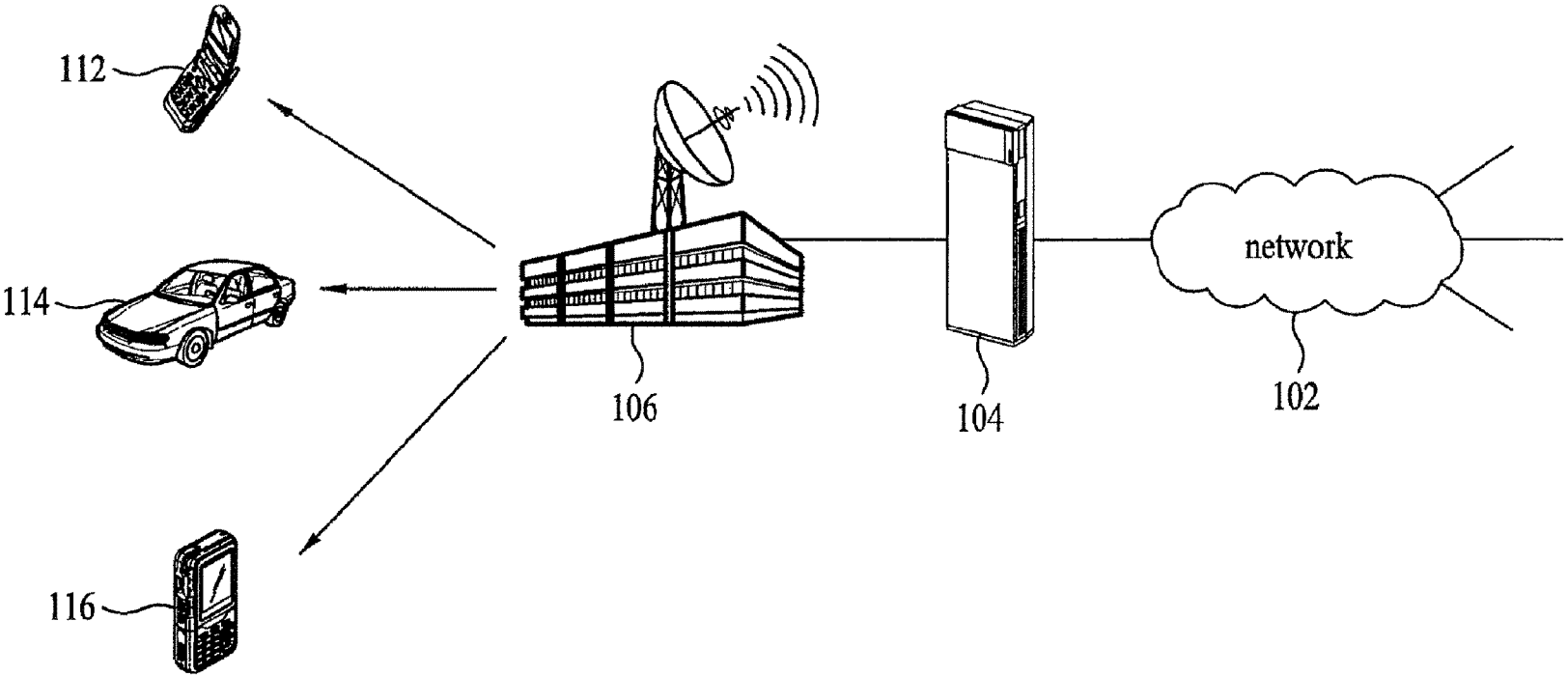
FIG. 1 is a conceptual diagram illustrating a network for providing traffic information according to the present invention.

FIG. 1 is a conceptual diagram illustrating a network for providing traffic information according to the present invention.

A method for providing traffic information via RF (Radio Frequency) signals according to the present invention will hereinafter be described with reference to FIG. 1.

Referring to FIG. 1, a TPEG provision server 104 reconstructs a variety of traffic information received from other servers or probe vehicles (also called probe cars) via a variety of paths (e.g., an administrator network or a network 102), such that it transmits the received traffic information to traffic-information receivers of a variety of terminals (e.g., a mobile phone 112, a vehicle 114, a PDA (Personal Digital Assistant) 116, or other hand-held terminals).

Also, the above-mentioned terminal may include a computer (e.g., a navigator or a notebook), however, it is not limited to the above-mentioned example, and can be applied to other examples as necessary.

In this case, the TPEG provision server 104 may use a data channel of a digital broadcast service as a traffic information transmission path, however, it may use a wired/wireless Internet, a broadband wireless medium (e.g., a Wi-Fi or a Wibro), or other Internets based on wired cables. Specifically, in the case of using a data service for a digital multimedia broadcast service, the TPEG provision server 104 may also use a TDC (Transparent Data Channel) protocol or MOT (Multimedia Object Transport) protocol of the digital broadcast medium.

However, the scope of the present invention is not limited to the above-mentioned transmission media, and can also be basically applied to other data structures capable of being transmitted via transmission media.

Figure 2:
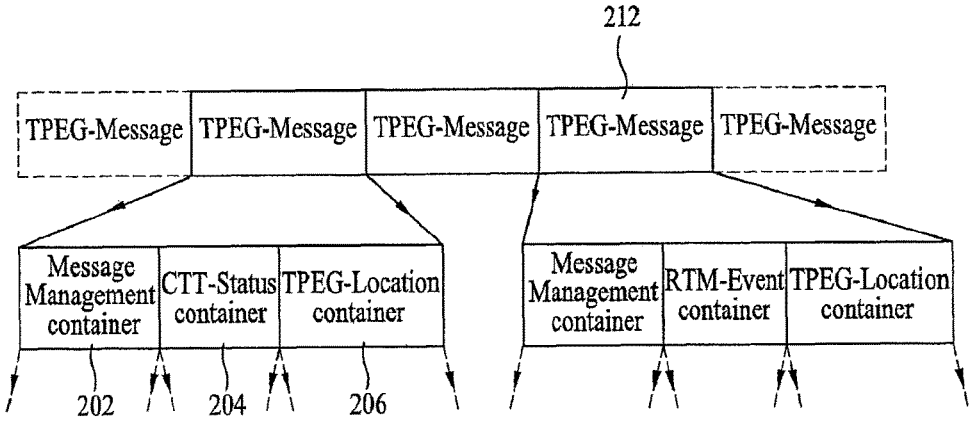
FIG. 2 is a structural diagram illustrating a traffic information format wirelessly transmitted or received according to the present invention.

FIG. 2 is a structural diagram illustrating a traffic information format wirelessly transmitted or received according to the present invention.

A traffic information format and a variety of containers contained in traffic information will hereinafter be described with reference to FIG. 2.

A traffic information format transmitted from the TPEG provision server 104 via RF signals includes a sequence composed of a variety of message segments. In this case, the message segment includes traffic information, and is referred to as a TPEG (Transport Protocol Expert Group) message.

A single message segment in the sequence includes a CTT message management container 202, a CTT-status container 204, and a CTT location container 206. However, the above-mentioned message segment may include a TPEG message 212 including not only traffic congestion status but also other traffic information. Two terms of status information may be contained in a single stream.

The above-mentioned CTT message management container 202 includes a message identification information and date/time information which is used for managing the information received.

The message ID information requisite for the message includes a message ID (Identifier) and a version number.

In this case, the message ID (MID) is indicative of an identifier of a single message associated with individual status of a service component.

The MID according to the present invention gradually increases the MID number by 1 from 0 at a time. If the MID value is the maximum value "65535", the maximum value "65535" is initialized to zero.

The version number indicates a sequential number for identifying successive messages having a single message ID. The version number according to the present invention may be determined to be any one of 0~255, and the version number may be sequentially increased in the range from 0 to 255.

The date/time information contained in the CTT message management container according to the present invention does not include start and end times, a message deletion time, and schedule information in the traffic congestion information, differently from other information (i.e., an incident and unexpected accident (road traffic message), and a public transportation status) of the TPEG message.

The congestion and travel time information is not like the unexpected accident varying with time, and includes current congestion and travel time information of each road, therefore it is sequentially transmitted.

Specifically, a message generation time is based on a real message generation time. A message transmission time among the message generation time is based on a transmission time of a corresponding message, and is contained in all messages. The message generation time and the message transmission time are required for a TPEG decoder to manage received messages.

The above-mentioned CTT status container 204 includes a plurality of congestion and travel time status components (ctt_component). The congestion and travel time status container (ctt_component) 204 includes traffic-flow status information, traffic-flow status prediction information, and additional information.

A CTT component (ctt_component) to which an identifier "80 hex" is allocated includes a status component (status_component). The status component (status_component) includes a link average speed, a link-travel time, a link delay time, and congestion type.

A CTT component (ctt_component) to which an identifier "81 hex" is allocated includes a prediction status component (prediction_status_component) for transmitting traffic congestion status prediction information. The prediction status component (prediction_status_component) includes a link prediction average speed, a prediction travel time, and prediction status information associated with a link speed change.

A CTT component (ctt_component) to which an identifier "8A hex" is allocated includes additional information associated with congestion and travel time information, e.g. basic status information or prediction status information. The status component including the above-mentioned additional information is formed on the condition that the presence of the additional information is determined.

The TPEG location container 206 includes a plurality of TPEG location component (tpeg_loc_component) equipped with location information of a link. In this case, the location information may be information based on a coordinates system and information of a predetermined link ID. Each TPEG location container (tpeg_loc_container) includes at least one location coordinates component (location_co-ordinates_component) to which an ID "00 hex" is allocated.

The above-mentioned CTT component includes information of a link acting as a target object of both the traffic-flow information and the traffic-flow prediction information. The above-mentioned link information includes a road-type list, a WGS 84 indicative of location coordinates, a link vertex, a link ID, and a link explanation, etc.

FIG. 3A is a syntax of some parts of a component frame including traffic information according to the present invention. FIG. 3B is a structural diagram illustrating a common structure of a traffic information message component according to the present invention.

Referring to FIGS. 3A to 3B, traffic congestion information wirelessly transmitted from the TPEG provision server 104 is configured in the form of a component frame. As shown in FIG. 3A, the frame includes a message number field 302 indicating the number of messages contained in the frame and a traffic congestion information message sequence 304 corresponding to the number of messages contained in the message number field 302.

The traffic congestion information message component includes an ID field 312, a byte-unit's component data length field 314, and a corresponding data field 316.

FIG. 4 is a structural diagram illustrating a class contained in a status container according to the present invention.

Referring to FIG. 4, the CTT-status container according to the present invention hierarchically includes a traffic-flow status(CTT_Status) class 402, a traffic-flow prediction(prediction CTT_Status) class 404, and an additional information class 406. The reason why the traffic-flow status class (CTT_Status) 402, the traffic-flow prediction(prediction CTT_Status) class 404, and then the additional information class 406 are hierarchically configured is to guarantee terminal compatibility required for the extended standard and the added component.

In this case, the traffic-flow status class 402 describes information of the degree of traffic-flow of vehicles for each link, the traffic-flow status prediction class 404 describes information of the degree of traffic-flow of vehicles for each link. The additional information class 406 describes traffic congestion information for each TPEG message, and additional- or auxiliary-information associated with the traffic congestion information, and is configured in the form of text data differently from other classes.

Components contained in each class will hereinafter be described with reference to FIGS. 5A~5E and 6A~6D.

FIG. 5A is a structural diagram illustrating a traffic congestion status component equipped with traffic information contained in a CTT-status container according to the present invention. FIGS. 5B to 5E show exemplary syntaxes of several status components contained in the traffic congestion status component of FIG. 5A according to the present invention.

Referring to FIG. 5A, a specific ID "80 hex" 502 is allocated to a traffic congestion status component (ctt_component) 80 transmitting current traffic-flow status information contained in a CTT-status container. The CTT component 80 includes a byte-unit data length field 504 of a corresponding component, and m status components (status_component) 506.

Each status component (status_component) includes the link average speed, the link-travel time, the link delay time, and/or the link congestion type, which are configured in the forms of FIGS. 5A to 5E.

Referring to FIG. 5B, the status component ("status_component(00)") including the link average speed is allocated with the ID "00 hex", and data of the speed defined in units of Km/h is contained in the status component ("status_component(00)").

As shown in FIG. 5C, an ID "01 hex" is allocated to the status component("status_component(01)") equipped with link-travel time information, and data of the link-travel time is defined in units of seconds (i.e., sec. units).

As shown in FIG. 5D, an ID "02 hex" is allocated to the status component("status_component(02)") equipped with the link-delay time information, and data of the delay time is defined in units of seconds.

As shown in FIG. 5E, an ID "03 hex" is allocated to the status component("status_component(03)") equipped with data indicating the type of congestion, and the type of congestion is represented by tables shown in FIG. 11A.

FIG. 6A is a structural diagram illustrating a traffic congestion status component equipped with congestion and travel time prediction information contained in a CTT-status container according to the present invention. FIGS. 6B to 6D show exemplary syntaxes of several prediction status components contained in the traffic congestion status component of FIG. 6A according to the present invention.

Referring to FIG. 6A, an ID "81 hex" is allocated to a CTT-status container ("ctt_component(81)") for transmitting congestion and travel time prediction information contained in the CTT status container. The CTT-status container ("ctt_component(81)") includes a field 604 indicating the length of byte-unit data and a plurality of prediction status components (prediction_status_component) 606.

Each prediction status component (prediction_status_component) includes the above-mentioned prediction link average speed of FIG. 6B, the prediction link-travel time of FIG. 6C, and/or the prediction speed change information of FIG. 6D.

As shown in FIG. 6B, an ID "00 hex" is allocated to the prediction status component ("prediction_status_component (00)") equipped with the prediction link average speed, and speed data is defined in units of Km/h, such that the Km/h-unit speed data is contained in the prediction status component ("prediction_status_component(00)"). Also, prediction time data defined by a user is contained in the prediction status component ("prediction_status_component (00)").

As shown in FIG. 6C, a specific ID "01" is allocated to the prediction status component ("prediction_status_component (01)") equipped with the prediction link-travel time, and time data is defined in units of seconds, such that second-unit time data is contained in the prediction status component ("prediction_status_component(01)"). User-defined prediction time is contained in the prediction status component ("prediction_status_component(01)").

As shown in FIG. 6D, an ID "02 hex" is allocated to the prediction status component ("prediction_status_component (02)") equipped with congestion tendency information. Congestion tendenty is represented by the table shown in FIG. 11B.

FIG. 7 is a syntax of a status component including additional information according to the present invention. FIG. 11A is a code table illustrating the congestion type among traffic information according to the present invention. FIG. 11B is a code table illustrating a congestion tendency among traffic information according to the present invention.

Referring to FIG. 7, a specific ID "8A hex" is allocated to the CTT component (8A) equipped with additional information. Additional information data contained in the CTT component 8A includes CTT-associated additional information for each message and auxiliary information for each message. In this case, the CTT-associated additional information and the auxiliary information are configured in the form of text data.

For example, if the status component("status_component (03)") equipped with the congestion type information shown in FIG. 5E does not recognize congestion type for each link shown in FIG. 11A in a specific field indicating the traffic-delay degree, a specific code "0" is recorded in the status component("status_component(03)").

If the congestion type for each link shown in FIG. 11A is determined to be a smooth traffic status in the aforementioned specific field, a specific code "1" is recorded in the status component ("status_component(03)"). If the degree of traffic delay for each link shown in FIG. 11A is determined to be a delayed traffic status in the aforementioned specific field, a specific code "3" is recorded in the status component ("status component(03)"). If the congestion type for each link shown in FIG. 11A is determined to be a traffic jam status in the aforementioned specific field, a specific code "4" is recorded in the status component("status_component (03)").

If the degree of traffic status is not defined in the form of code tables, a CTT component 8A including additional information may be used for the above-mentioned situation.

For another example, if a speed change information field contained in the prediction status component("prediction_status_component(02)") equipped with the link speed change information of FIG. 6D does not recognize a difference between a first speed for each link and a second speed prior to a predetermined time as shown in FIG. 11B, a specific code "0" is recorded in the status component ("status_component(03)"). If the first speed for each link is higher than the second speed prior to the predetermined time, a specific code "1" is recorded in the status component ("status_component(03)"). If the first speed for each link is lower than the second speed prior to the predetermined time, a specific code "2" is recorded in the status component ("status_component(03)"). If the first speed for each link is maintained to be equal to the second speed prior to the predetermined time, a specific code "3" is recorded in the status component (03).

However, if the link speed change information is not defined by the above-mentioned code tables, the additional information component may be used for the above-mentioned situation. In more detail, video data captured by a camera capable of capturing a traffic status for each link is contained in an additional information component, such that the additional information component equipped with the video data may be transmitted to a user or users. In this case, the video data may include moving images and still images.

For still another example, if a famous restaurant or a historical place or theater is contained in a specific link indicating the status information, information associated with the above-mentioned places may also be contained in the CTT component (8A).

For still another example, the CTT component (8A) equipped with the additional information may include multimedia information, which includes text data, variety of video data, and variety of audio data. The multimedia information using the additional information component can be provided via a unidirectional service (e.g., a broadcast service), however, it can be more efficiently used for a communicational service associated with either a unique IP address of a wired/wireless LAN or a unique code (e.g., a CDMA).

For example, if a user defines his or her interest area or place (e.g., a POI (Point Of Interest)), the additional information component may also be provided to the user using multimedia information associated with the above-mentioned interest area or place.

In more detail, if the user selects a movie theater, he or she may recognize title information of currently-played movies by referring to the above-mentioned multimedia information, may buy a ticket of a desired movie in advance by referring to the same, and may recognize the number of unsold tickets, a current parking status of a parking lot of the movie theater, and the number of vehicles capable of entering the parking lot using audio (video) data, video data, or text data.

Also, if the user selects a desired restaurant, he or she may recognize a menu of the selected restaurant, its price, the number of remaining tables using moving images, still images, audio data or text data by referring to the multimedia information.

For still another example, the CTT component("ctt_component(8A)") may include additional information associated with detailed location data. For example, the CTT component (8A) may include not only longitude- and latitude coordinates but also angle or height information incapable of being expressed by coordinates. By means of the above-mentioned information, subway route map information, underground passage information, and overpass information may also be provided to the user. Otherwise, a cubic map (e.g., a 3D or 4D map) may also be provided to the user as necessary.

FIG. 8 is a structural diagram illustrating a traffic congestion status component equipped with location reference information of a specific link corresponding to status information according to the present invention. FIG. 9 is a structural diagram illustrating a TPEG location container including location information corresponding to status information according to the present invention.

As shown in FIG. 8, a specific ID "90 hex" denoted by 802 is allocated to a CTT component 90 indicating link location information as denoted by 802. A field 804 for representing a data length of a corresponding component in byte units is contained in the CTT component 90. The CTT component 90 further includes at least one TPEG location sub-container (tpeg_loc_container) 806.

As can be seen from FIG. 9, the TPEG location sub-container (tpeg_loc_container) includes a specific field represented by codes defined in a table "loc41" (not shown) for the TPEG location component. For example, in the case of the Korean language, data "loc41_65" is recorded in the TPEG location sub-container. Also, the TPEG location container may include at least one TPEG location container (tpeg_loc_component).

FIG. 10A is a structural diagram illustrating a TPEG location component equipped with location information contained in a TPEG location container according to the present invention. FIGS. 10B to 10K exemplarily show a plurality of location coordinates components contained in a status component of FIG. 10A according to the present invention.

Referring to FIG. 10A, a specific ID "00 hex" (1002) is allocated to the TPEG location component (00) "tpeg_loc_component" indicating location information. The TPEG location component (00) "tpeg_loc_component" includes a field 1004 indicating a corresponding component data length in byte units. Also, the TPEG location component (00) "tpeg_loc_component" includes a specific field 1006 capable of indicating a location type using codes prescribed in the location reference table "loc01" (not shown), and also includes at least one coordinates component (co_ordinates_component) 1008.

Referring to FIG. 10B, a specific ID "00 hex" is allocated to the coordinates component ("co_ordinates_component (00)") equipped with road type information. The coordinates component ("co_ordinates_component(00)") also includes at least one road type component "roadtype_component".

Referring to FIG. 10C, an ID "00 hex" is allocated to the road type component "roadtype_component", such that the road type component "roadtype_component" indicates whether a road is a national road (code loc42_1), a local road (code loc42_2), or an expressway (code loc42_3) by referring to the codes defined in the location reference table (loc42) (not shown).

Referring to FIG. 10D, a specific ID "01 hex" is allocated to the coordinates component ("co_ordinates_component (01)") for indicating location coordinates information using the WGS 84 format. The above-mentioned coordinate component (01) includes at least one WGS 84 component "WGS84_component". Also, the coordinates component (01) further includes a specific field capable of indicating longitude/latitude information in 10 micro-degree units.

Referring to FIG. 10E, a specific ID "02 hex" is allocated to the coordinates component "co-ordinates_component 02" indicating vertex information, and the coordinates component (02) includes a specific field indicating the number of vertexes. Also, the coordinates component (02) includes at least one vertex component ("vertex_component") to which vertex data is loaded.

In this case, the above-mentioned vertex allows a terminal for receiving traffic information to recognize either coordinates or a link shape designated by a link ID, such that the above-mentioned terminal can express the recognize coordinates or link shape in the form of graphic data using the vertex. The vertex is latitude/longitude information defined by the WGS 84 format. However, it should be noted that the scope of the above-mentioned term "vertex" can also be applied to similar terms or other examples as necessary.

Referring to FIG. 10G, a specific ID "00 hex" is allocated to a vertex component("vertex_component (00)") indicating the vertex information. The above-mentioned vertex component("vertex_component (00)") includes latitude/longitude data designated by 10 micro-degree units. In this case, the latitude/longitude data starts from "0", such that it increases by 10 micro-degree units.

The traffic-information receiving terminal unequipped with an electronic map can more realistically display the road shape on the basis of a current location on the screen.

Therefore, the number of vertexes has a scale (e.g., a scale of 10000:1) lower than that of an electronic map stored in a disc. The vertex component (00) may include the number of vertexes to visually display a desired road on a VGA or QVGA. For example, the number of vertexes may be determined to be equal to or less than 23.

Referring to FIG. 10H, a specific ID "10 hex" is allocated to the coordinates component("co-ordinates_component (10)") indicating link ID information. The vertex component ("vertex_component(01)") indicates location reference link ID categories using the location reference table "loc 43" (not shown). For example, in the case of using a specific ID contained in an intelligent traffic system standard node link prescribed by Ministry Of Construction & Transportation (MOCT) of Republic of Korea, the above-mentioned location reference link ID category information is denoted by "loc 43_1". At least one link component "link_component" is contained in [vertex component("vertex_component (00)")] *coordinates component ("coordinates_component (10)")*.

Referring to FIG. 10I, a specific ID "00 hex" is allocated to the link component("link_component(00)") equipped with link ID data, such that the link component("link_component(00)") includes predetermined link ID data defined in either the traffic information receiving terminal or the traffic information server.

Referring to FIG. 10J, a specific ID "03 hex" is allocated to a coordinates component("co-ordinates_component(03)") equipped with link descriptor information. The coordinates component("co-ordinates_component(03)") includes link descriptor information written in either a descriptor format or text data using codes defined in the table loc03 (not shown) indicating a location reference descriptor format. Also, the coordinates component("co-ordinates_component (0)") includes at least one descriptor component ("descriptor_component").

A specific ID "00 hex" is allocated to the descriptor component("descriptor_component (00)") equipped with direction type information, such that the descriptor component ("descriptor_component(00)") indicates a direction type using codes defined in the table (loc02). For example, the descriptor component ("descriptor_component(00)") may indicate whether a current direction is the east, the west, or the opposite direction.

Figure 12:
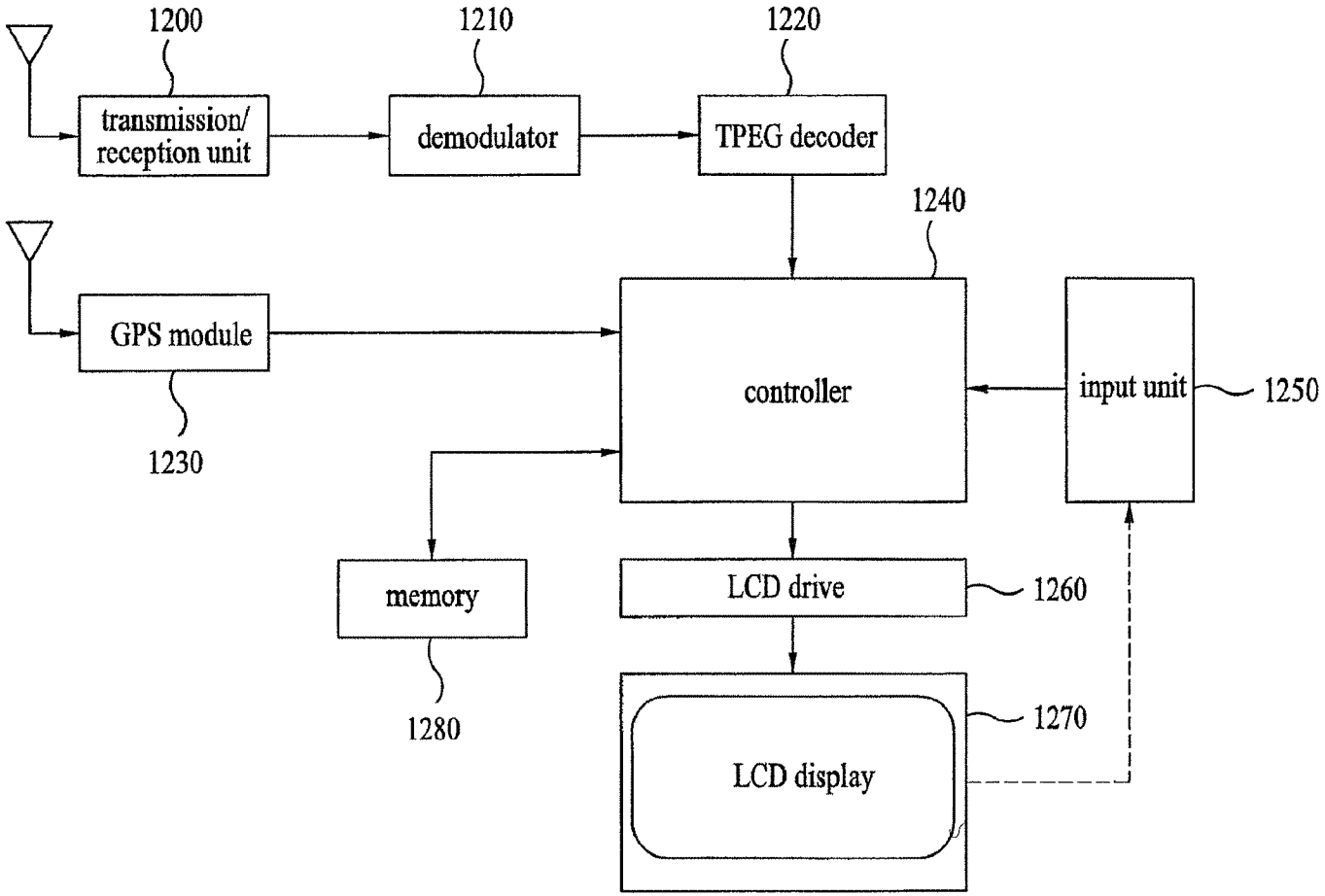
FIG. 12 is a block diagram illustrating a terminal capable of receiving traffic information from a server according to the present invention.

FIG. 12 is a block diagram illustrating a terminal capable of receiving traffic information from a server according to the present invention.

Referring to FIG. 12, a terminal for employing the received traffic information includes a Radio Frequency (RF) transmission/reception unit 1200, a demodulator 1210, a TPEG decoder 1220, a GPS module 1230, a controller 1240, an input unit 1250, an LCD drive 1260, an LCD display 1270, and a storage unit 1280, etc. The above-mentioned components shown in FIG. 12 will hereinafter be described in detail.

Referring to FIG. 12, the RF transmission/reception unit 1200 performs tuning of a signal band for providing traffic information, and outputs a modulated traffic information signal to the demodulator 1210.

If the demodulator 1210 demodulates the modulated traffic information signal and outputs the demodulated traffic information signal to the TPEG decoder 1220, the TPEG decoder 1220 decodes the demodulated traffic information signal such that it acquires various traffic information from the decoded signal.

The GPS module 1230 receives satellite signals from a plurality of low-orbit satellites, such that it recognizes current location information (e.g., a longitude, a latitude, or an altitude). The storage unit 1280 includes both an electronic map equipped with information of links or nodes and various graphic information. The input unit 1250 receives data entered by a user (i.e., user input data).

The controller 1240 receives user input information entered by the input unit 1250, current location information recognized by the GPS module 1230, and traffic information acquired by the RF transmission/reception unit 1220, such that it controls the screen display operation using the received information.

The LCD display 1270 receives a drive signal based on graphic data received from the controller 1240 from the LCD drive 1260, such that it visually displays the received signal on the screen. The input unit 1250 may be implemented with a touch-screen contained in the LCD display 1270, or may be a keypad, a jog-dial, or a point-stick.

The RF transmission/reception unit 1200 performs tuning of a signal transmitted from the TPEG provision server 104. The demodulator 1210 demodulates the tuned signal according to a predetermined scheme, and outputs the demodulated signal. Therefore, the TPEG decoder 1210 decodes the received demodulated signal into the TPEG message sequence of FIG. 2, analyzes each TPEG message of the above-mentioned sequence, and outputs necessary information and/or control signals required for the message content to the controller 1240.

Various information and/or control signals are transmitted from the TPEG decoder 1220 to the controller 1240.

It should be noted that the present invention mainly describes the traffic congestion information shown in FIGS. 5A~10K for the convenience of description. However, as well known to those skilled in the art, the above-mentioned explanation of the present invention is not limited to the above-mentioned examples, and the scope of the present invention can also be applied to other examples as necessary.

The TPEG decoder 1220 extracts a message ID (i.e., a message component), a message generation time, a message transmission time from the message management container 202 of each TPEG message, such that it determines whether the following container is equal to a CTT-status container 204 on the basis of information of the message component.

In this case, the message component information includes a message ID and a version number, is requisite for all messages, and is adapted to manage the TPEG decoder 706's messages.

If the following container is determined to be the CTT-status container 204, the TPEG decoder 1220 transmits information acquired from the CTT status component of the CTT status container 204 to the controller 1240, such that the controller 1240 performs display operations according to traffic-flow status information and traffic-flow prediction information.

Also, the TPEG decoder acquires location information corresponding to the currently-transmitted traffic-flow information from the following TPEG location container 206.

In this case, the location information may be location coordinates (latitude and longitude) of start and end points or a link of the start and end points according to type information of the TPEG location container. In other words, the location information may be a link ID allocated to a road section (i.e., a link).

If the storage unit 1280 is contained in the terminal, the controller 1240 specifies a link corresponding to the received information by referring to link- or node-information stored in the storage unit 1280. The controller 1240 converts location information of a received link into a link ID, or converts the link ID into the location information of the received link.

In the meantime, the controller 1240 reads data of an electronic map from the storage unit 1280 on the basis of current location coordinates received from the GPS module 1230, and displays the read electronic map data on the LCD display 1270 via the LCD drive 1260. In this case, a specific graphic sign is displayed at a specific point corresponding to the current location.

Under the above-mentioned situation, the controller 1240 receives link average speed information from the TPEG decoder 1220, such that the received information is displayed at specific location coordinates of a location container following the container equipped with the link average speed information or at a link corresponding to a link ID. For the above-mentioned operation, different colors are allocated to individual link average speeds as shown in FIGS. 13A to 13B.

Figure 13A:
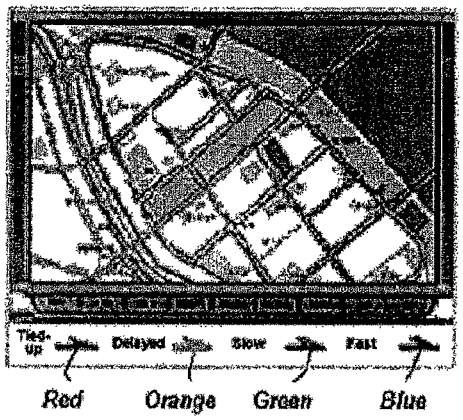
FIGS. 13A to 13C exemplarily show methods for displaying an average speed of each link on a screen according to the present invention.
Figure 13B:
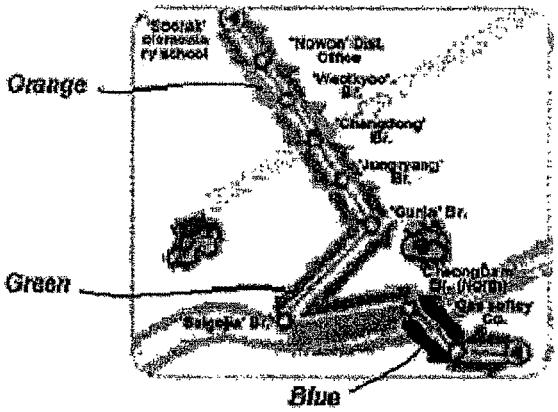
Figure 13C:
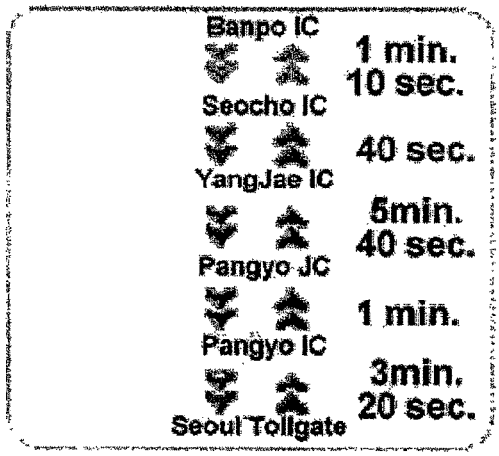

FIGS. 13A to 13C exemplarily show methods for displaying an average speed of each link on a screen according to the present invention.

For example, if a current road is determined to a current road, the red color is indicative of 0~10 km per hour, the orange color is indicative of 10~20 km per hour, the green color is indicative of 20~40 km per hour, and the blue color is indicative of at least 40 km per hour. For another example, the link average speed may be represented by numerals as shown in FIG. 13C.

If the link speed change information received from the TPEG decoder 1220 has a specific value "1" or "2", a character string ("Increase" or "Reduction") or icon allocated to the specific value "1" or "2" may also be displayed on a corresponding link along with the link speed change information.

If the link speed change information received from the TPEG decoder 1220 has a specific value "0" or "3", a displayed status is not updated to a new status, such that a current displayed status remains.

If the link speed change information is determined to be average speed change rate information, it is displayed on the screen according to the user's request, such that it can reduce the degree of visual confusion of a vehicle driver.

For example, paths of possible routes (e.g., a predetermined traveling path and a predetermined forwarding path) may be simultaneously displayed on the screen as necessary.

If the terminal does not include the storage unit 1280 equipped with the electronic map, a link average speed associated with only a forward link of a current traveling path may be displayed in different colors (See FIG. 13B), or may be displayed in different numerals (See FIG. 13C).

If a traveling path of the vehicle equipped with the TPEG terminal is predetermined, link average speed information of links contained in the traveling path, instead of the forwarding links, may be displayed.

If the additional information received from the TPEG decoder 1220 is indicative of a famous restaurant or movie theater contained in the link, the controller 1240 indicates corresponding points at the link displayed on the LCD display 1270, such that the point corresponding to the restaurant is visually distinguished from the other point corresponding to the movie theater.

And, the controller 1240 may convert the corresponding information into text information, such that it may display the text information on the screen.

Upon receiving the user's request, the controller 1240 receives a link-travel time, a link delay time, and the degree of traffic delay associated with individual links from the TPEG decoder 1220, such that it may display the received information, instead of the link average speed, on the LCD display 1270.

If the user specifies a prediction time using the input unit 1250 and requests prediction information associated with the traffic-flow status, the controller 1240 receives a prediction average speed of each link from the TPEG decoder 1220, such that it indicates the received link prediction average speed in the form of color- or numeral-data, instead of a current average speed.

Needless to say, if the user requests a display mode of a prediction passing-time mode, instead of the prediction average speed, the controller 1240 displays the received prediction passing-time information of each link on an electronic map or graphic screen of the LCD display 1270 according to the above-mentioned user's request.

In the meantime, if a function for automatically searching for a path of a destination is pre-established in the controller 1240, the controller 1240 may search for or may re-search for a desirable path on the basis of the received link prediction average speed or the received link prediction travel time.

For example, in association with individual links leading to a node at which a user's vehicle will arrive after the lapse of 30 minutes from a current time at a current traveling speed, the controller 1240 selects a specific link having the shortest time to the destination as a traveling path using a prediction average speed or link prediction travel time acquired over the past 30 minutes, and displays the selected link on the screen.

If the terminal of FIG. 12 includes an audio output unit (or a voice output unit), traffic-flow status information or traffic-flow status prediction information received from a designated link may be outputted in the form of voice or audio signals.

As described above, the information and/or control signals received from the TPEG decoder 1220 are temporarily stored in the recordable storage unit 1280, and are then used in the controller 1240.

The controller 1240 employs the information of the storage unit 1280, does not discard the employed information, and stores information created within a predetermined time (e.g., within the last 1 hour).

In this case, the controller 1240 stores the last 1-hour information as an average speed or link travel time at intervals of 20 minutes (i.e., 0 minutes, 20 minutes, and 40 minutes).

The last time may be set to other time longer or shorter than the aforementioned 1 hour according to the available memory capacity.

In this way, if the user selects a specific link via the input unit 1250 on the condition that an average speed of each link is stored in the storage unit 1280, the controller 1240 operates the LCD drive 1260, such that the LCD display 1270 displays not only an average speed history and link travel time history of the selected link, but also a prediction link average speed and prediction link travel time of the selected link in the form of a graph.

As a result, the graph indicating the average speed history, the link travel time history, the prediction link average speed, and the prediction link travel time of the selected link is displayed on the LCD display 1270.

In this case, if a number marked on the graph is speed information, the controller 1240 converts the stored information into data of units of km/h, and displays the data of km/h units on the LCD display 1270.

And, current link name (e.g., a road name) is displayed at an upper part of the graph. The road name of the link is contained in the location coordinates of the TPEG location container 206 or a rear part of a link ID, and is then received.

Otherwise, the above-mentioned link road name is contained in the electronic map of the storage unit 1280.

Besides, current traffic information, previous traffic information, and future traffic information may be displayed in various ways.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

A method and apparatus for providing traffic information according to the present invention provides a vehicle driver who travels along a traffic-jam road or congested road with road traffic status information in real time, such that the vehicle driver can arrive a desired destination within the shortest time using predicted road traffic information.

Also, the method and apparatus for providing traffic information according to the present invention pre-informs users or drivers of the congested traffic status, and properly dissipates the volume of traffic, resulting in the effective implementation of road status information.

The invention claimed is:

1. An apparatus for decoding a Transport Protocol Expert Group (TPEG) traffic information message comprising:

a decoder for extracting traffic information from the TPEG traffic information message, the extracted traffic information including message management information including (1) message identification (ID) information indicating that the traffic information is status information and (2) a generation time of the traffic information message, status information including traffic-flow status information of a link, and location information including latitude and longitude information of the link corresponding to the traffic-flow status information; and a controller for outputting the traffic-flow status information by referring to the location information, wherein the status information further includes additional information in the form of text data and a language code identifying a language of the text data, the location information further includes vertex information of a vertex within the link, wherein the vertex information includes longitude and latitude information of the vertex, the latitude and longitude information of the link being different from the latitude and longitude information of the vertex.

2. The apparatus according to claim 1, wherein the controller controls to extract average speed data of the link from the traffic-flow status information, and display the extracted average speed data.

3. The apparatus according to claim 1, wherein the controller controls to extract travel time data of the link from the traffic-flow status information, and display the extracted travel time data.

4. The apparatus according to claim 1, wherein the controller extracts delay time data of the link from the traffic-flow status information, and displays the extracted delay time data.

5. The apparatus according to claim 1, wherein the controller extracts traffic congestion type data of the link from the traffic-flow status information.

6. The apparatus according to claim 1, wherein the decoder is configured to use the message generation time to manage received messages.

7. The apparatus according to claim 1, wherein the status information further includes additional information in the form of image data or video data.

8. The apparatus according to claim 1, wherein the additional information describes a point of interest associated with the link and the decoder is configured to extract the information describing the point of interest associated with the link.

9. An apparatus for decoding a Transport Protocol Expert Group (TPEG) traffic information message, comprising:

a reception unit configured to receive the TPEG traffic information message, the TPEG traffic information message including a congestion and travel time message segment, the congestion and travel time message segment relating to a link and including:

a message management container including message management information, the message management information including a message generation time of the congestion and travel time message segment and a message identifier identifying the congestion and travel time message segment;

a status container including a plurality of congestion and travel time status components, the plurality of congestion and travel time status components including:

a traffic flow status information component including traffic flow status information and a traffic flow status identifier identifying that the traffic flow status information component relates to traffic flow status information; and an additional information component including additional information, an additional information component identifier identifying that the additional information component relates to additional information, and a language code indicating the language of the additional information; and a location container including at least one TPEG location component, the TPEG location component including location information identifying the link and a location information identifier identifying the type of the location information, the location information including latitude and longitude information of the link, and vertex information of a vertex within the link, the vertex information including latitude and longitude information of the vertex, the latitude and longitude information of the link being different from the latitude and longitude information of the vertex;

a decoder configured to extract the message management information, the traffic flow status information, the additional information, and the location information in the congestion and travel time message segment.

10. The apparatus of claim 9, wherein:

the traffic flow status information component is a traffic flow prediction status information component;

the traffic flow status information is traffic flow status prediction information; and the traffic flow status information identifier is a traffic flow prediction status identifier identifying that the traffic flow prediction status information component relates to traffic flow prediction status information.

11. The apparatus of claim 9, wherein the message management information further comprises a transmission time of the congestion and travel time message segment.

12. The apparatus of claim 9, wherein the plurality of congestion and travel time status components includes a traffic flow status information component and a traffic flow status information prediction component.

13. The apparatus of claim 9, wherein the traffic flow status information includes average speed data of the link; and wherein the decoder is further configured to extract the average speed data of the link.

14. The apparatus of claim 9, wherein the traffic flow status information includes travel time data for the link; and wherein the decoder is further configured to extract the travel time data for the link.

15. The apparatus of claim 9, wherein the traffic flow status information includes a congestion type; and wherein the decoder is further configured to extract the congestion type.

*16. The apparatus according to claim 1, wherein the message management information further includes a version number indicating a sequential number for identifying successive TPEG traffic information messages having a single message identifier.*

*17. An apparatus for decoding a Transport Protocol Expert Group (TPEG) traffic information message comprising:*

*a decoder for extracting traffic information from the TPEG traffic information message, the extracted traffic information including*

*message management information including (1) message identification (ID) information and (2) a generation time of the traffic information message,*

*status information including traffic-flow status information of a link, and*

*location information including latitude and longitude information of the link corresponding to the traffic-flow status information; and*

*a controller for outputting the traffic-flow status information,*

*wherein the status information further includes additional information in the form of text data and a language code identifying a language of the text data, the location information further includes vertex information of a vertex within the link, wherein the vertex information includes longitude and latitude information of the vertex, the latitude and longitude information of the link being different from the latitude and longitude information of the vertex.*

* * * * *